Nov. 6, 1945. G. S. HILL Re. 22,689

ICE MAKING APPARATUS

Original Filed April 27, 1943 2 Sheets-Sheet 1

Inventor:
George S. Hill,
by Edwin Z. Rich
His Attorney.

Nov. 6, 1945. G. S. HILL Re. 22,689

ICE MAKING APPARATUS

Original Filed April 27, 1943 2 Sheets-Sheet 2

Inventor:
George S. Hill,
by Edwin L. Rich
His Attorney.

Reissued Nov. 6, 1945 Re. 22,689

UNITED STATES PATENT OFFICE 22,689

ICE MAKING APPARATUS

George S. Hill, North East, Pa., assignor to General Electric Company, a corporation of New York Original No. 2,374,997, dated May 1, 1945, Serial No. 484,726, April 27, 1943. Application for reissue August 20, 1945, Serial No. 611,616

9 Claims. (Cl. 62—2)

My invention relates to refrigerating apparatus and particularly to such apparatus for automatically freezing water or other liquids to form blocks of frozen material.

Apparatus has been provided heretofore for freezing liquid and for automatically ejecting the frozen blocks so that the molds may be employed continuously to form a supply of ice blocks. These devices have the advantage that it is possible to make considerable quantities of ice in the form of small blocks without the necessity of providing great numbers of molds. Difficulty has been experienced with apparatus of this type because of the necessity of providing measured quantities of the water or other liquid to be frozen so that the molds will not overflow and spill the liquid about the apparatus. Accordingly, it is an object of my invention to provide an improved apparatus for automatically making blocks of ice or similar material.

It is another object of my invention to provide apparatus for making blocks of ice or similar material, and which includes an improved arrangement for facilitating the removal of blocks of ice from the freezing mold.

Further objects and advantages of my invention will become apparent as the following description proceeds, and the features of novelty which characterize my invention will be pointed out with particularity in the claims annexed to and forming a part of this specification.

Figure 1:
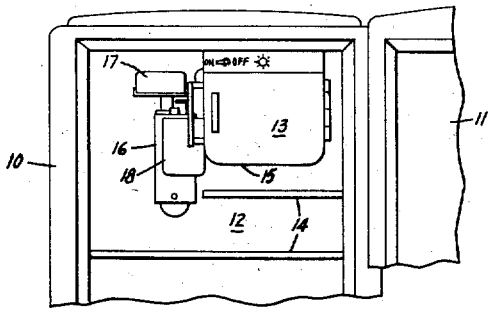
Figure 2:
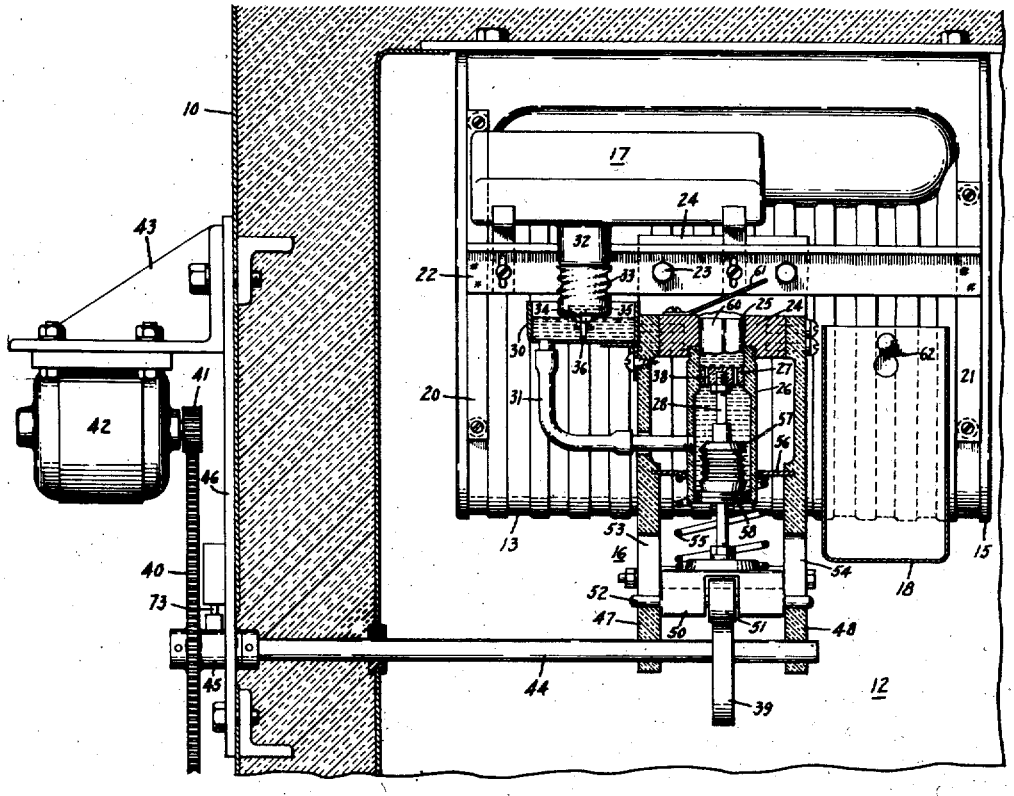
Figure 3:
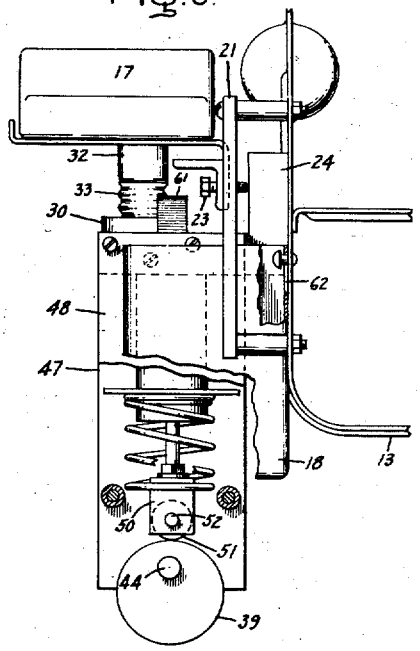
Figure 4:
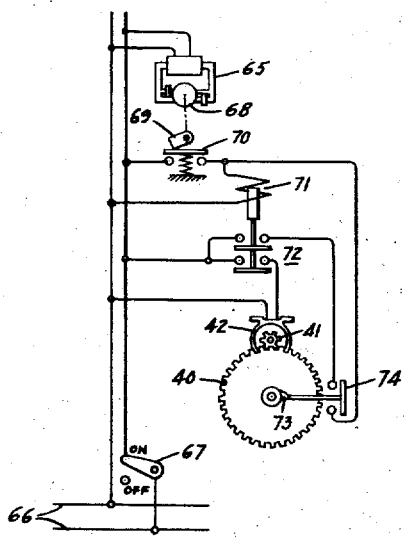

For a better understanding of my invention, reference may be had to the accompanying drawings in which Fig. 1 is a partial front elevation view of a household refrigerator provided with an ice making apparatus embodying my invention; Fig. 2 is an enlarged sectional side elevation of the ice making apparatus shown in Fig. 1; Fig. 3 is a front elevation view of a portion of the apparatus shown in Fig. 2; and Fig. 4 is a schematic diagram of the electric control for the apparatus shown in the other figures.

Briefly, the freezing apparatus illustrated in the drawings comprises a freezing cell arranged to be cooled by the evaporator of a refrigerating machine and an arrangement for supplying liquid to be frozen from a thermally insulated chamber below the cell. An ice block ejecting plunger is provided which is actuated by a cam mechanism, the arrangement being such that the cell is automatically filled upon the restoration of the ejecting plunger to its normal position. The head of the plunger may be constructed so that it closes the lower end of the cell and forms the bottom wall of the ice mold and the upper portion of the walls of the insulated chamber below the cell is constructed to form the lower portion of the side wall of the cell in such a manner that freezing of the liquid about the plunger is prevented. A timing mechanism is provided to operate the cam mechanism and eject ice blocks periodically until the supply of liquid has been exhausted.

Referring now to the drawings, the refrigerator illustrated in Fig. 1 comprises a thermally insulated cabinet 10 having a door 11 for closing a food storage compartment 12; an evaporator or cooling unit 13 is provided to cool the air within the food storage compartment and thereby to cool articles which may be placed on grills or shelves 14 within the compartment. The evaporator 13 provides a freezing chamber closed by a door 15, this chamber being suitable for the storage of frozen foods and also for freezing water desserts and the like. In order to provide a supply of ice blocks without the necessity of using up the storage space within the evaporator, an ice freezing apparatus 16 is mounted at the side of the evaporator 13 and is arranged to receive water from a supply reservoir or bottle 17 and to supply ice blocks to a collecting pan or receiver 18. The freezing apparatus 16 is operated automatically in a manner which is described below and produces a quantity of ice blocks determined by the capacity of the water reservoir 17, the receiver 18 being made sufficiently large to accommodate the blocks formed.

The details of construction of the ice freezing mechanism are more clearly shown in Figs. 2 and 3. The freezing mechanism 16 is securely held against the side of the evaporator 13 on a supporting structure including vertical members 20 and 21 and an angle iron cross piece 22. Bolts or cap screws 23 are threaded into the cross piece 22 and, when tightened into place, press a block 24 constructed of aluminum or other suitable material of good heat conductivity tightly against the side of the evaporator 13 in good heat exchange relation with the liquid refrigerant within the evaporator. The block 24 is provided with a slightly tapered substantially cylindrical recess or cell 25 extending therethrough. A chamber or condenser 26 constructed of heat insulating material is mounted immediately below the block 24 with its upper portion threaded into the block and having a throat or opening in alignment with the cell 25 and constituting a continuation thereof. The cell 25 as thus formed in the block 24 and in the throat of the condenser 26 constitutes the ice freezing cell or mold of the apparatus. The freezing cell is closed at its lower end by a plunger head 27 and the plunger is arranged to be moved upwardly through the cell by operation of a rod 28. The chamber 26 is maintained filled with water supplied from a pan 30 through a tube 31. The level of the water within the pan 30 is maintained near the top of the cell 25, the level being determined by the level of an outlet 32 from the reservoir 17; the outlet 32 is fitted with a cap member 33 having an outlet boss 34 within the pan 30. The level is maintained by the water seal formed about the opening in the boss 34 which prevents the admission of air to the reservoir 17, the level being restored whenever the pan 30 is drained sufficiently to admit air to the reservoir 17. A valve 35 is mounted on a rod 36 passing through the boss 34 so that the reservoir 17 may be removed, filled with water and returned without spilling. The valve 35 closes the outlet when the reservoir 17 is lifted from its position as shown, the valve 35 dropping into its position over the boss 34 when the rod 36 is lifted from the pan 30.

The plunger 27 is constructed, so that it affords passage of water from the lower portion of the chamber 26 to the mold 25, a plurality of passages 38 having been provided for this purpose. The plunger head 27 is constructed so that it is readily movable within the cell 25, and it may be made of substantially smaller diameter than the internal diameter of the cell.

When water is admitted to the cell 25 the upper portion freezes around the heat conducting walls formed by the block 24. The presence of the insulating wall 26 prevents or delays the freezing of water in the lower portion of the cell so that the plunger 27 is not frozen into place.

In order to eject ice blocks from the cell 25 periodically, a cam 39 is provided to actuate the plunger rod 28. The cam is driven through a gear 40 and pinion 41 by an electric motor 42 arranged on a bracket 43 outside the cabinet 10. The cam 39 is connected to the gear 40 by a shaft 44 journaled in a bearing 45 on a mounting plate 46 on the outside wall of the cabinet. The shaft 44 is also mounted in bearings formed in supporting members 47 and 48 which are secured at their upper ends to the block 24. The lower end of the plunger rod 28 is secured to a crosshead 50 having a roller 51 mounted on a shaft 52, the ends of the shaft 52 extend through slots 53 and 54 in the side members 47 and 48, respectively to guide the crosshead. The roller 51 is held against the surface of the cam 39 by a compression spring 55 arranged between the crosshead 50 and a support 56. The support 56 holds the container 26 rigidly in position with respect to the side members 47 and 48. In order to seal the chamber 26 about the rod 28 an expansible sealing bellows 57 is secured to the rod 28 and to a bottom closure member 58 of the chamber 26. The bellows may be constructed of rubber of similar material, or may be of metal. When the rod 28 is raised to press the plunger head 27 against a frozen block such as indicated at 60, the bellows 57 expands so that the loss of volume due to the removal of the block 60 is compensated substantially, and the new supply of water from the chamber 30 flows into the chamber 26 as the plunger is returned to its lower position after ejection of an ice block. This compensating action minimizes surging and splashing of the water during the return of the plunger. This minimizes any increase in level of the water within the pan 30 and the cell 25 due to withdrawing of excess water from the reservoir 17 while the plunger 27 is in its top position.

The motor 42 is operated periodically to rotate the cam 39 through a single revolution to raise the plunger 27 and to eject the ice block 60 and then to return the plunger to its lowermost position. The intervals between operations of the cam are spaced so that sufficient time is allowed to insure freezing of the block 60 to a desired depth. Since the tendency toward freezing the water around the plunger head 27 is minimized, a single setting of the rate or period of the control will be found adequate over a considerable range of temperatures of the evaporator.

When an ice block is moved upwardly through the cell 25, it engages a spring finger 61 which extends across the path of movement of the block; this bends the finger upwardly then as the block is pushed out of the cell, the finger presses the block toward the right and ejects or throws it laterally into the collecting pan 18. The collecting pan 18 is held in contact with the walls of the evaporator 13 to which it is removably secured by a bayonet fitting 62. The temperature of the pan 18 may thus be maintained below freezing; ice blocks ejected from the cell are thrown immediately into the container and freezing together of the blocks is minimized.

The control arrangement for the motor 42 is shown in Fig. 4. A synchronous timing motor 65 is connected across a suitable source of alternating current, indicated at 66, whenever a switch 67 is closed. The timing motor 65 is provided with a gear box 68 which rotates a cam 69 at a rate determined by the freezing time for an ice block within the cell. On each revolution, the cam 69 closes a switch 70 which energizes a solenoid or coil 71 to operate a switch 72. The lower contacts of the switch 72 close the circuit of the motor 42 and start the rotation of the gear 40. When the gear rotates a cam 73 allows a switch 74 to close, the switch 74 together with the upper contacts of the switch 72 provides a holding circuit for the coil 71. This maintains the motor 42 in operation regardless of the position of the cam 69 until the gear 40 has made one complete revolution. The relative rates of rotation of the cam 69 and the gear 40 are such that the switch 70 will always be opened before the gear 40 has completed one revolution. At the end of one revolution of the gear 40 the cam 73 opens the switch 74 thereby deenergizing the coil 71 and stopping the motor 42.

When it is desired to operate the freezing apparatus shown in the drawings, the reservoir or bottle 17 is removed from the refrigerator and the cap 33 unscrewed from the outlet 32, the reservoir is then filled with water and the cap replaced and the outlet 32 is turned in its downward position. The reservoir is placed on its supports in the refrigerator with the outlet 32 in the pan 30 so that the bottom of the pan engages the rod 36 and opens the valve 35 thereby filling the reservoir 30 to its normal level. The switch 67 is then turned to its "on" position, it being understood that the evaporator 13 is in operation to provide a freezing temperature. The size of the first block 60 ejected from the mechanism depends, of course, upon the position of the cam 69 when the switch 67 was last turned to its "off" position. However, the blocks ejected after the first block will normally be a uniform size. The operation of the mechanism to freeze and eject ice blocks will continue as long as there is a supply of water to fill the cell to its freezing level. The size of the ice receiver 18 is preferably sufficient to hold at least one batch of ice as determined by the quantity of the water in the reservoir 17. After this quantity of ice has been frozen, the switch 67 is turned to its "off" position and the receiver 18 may be removed from its position on the side of the evaporator by lifting it to disengage the bayonet joint or connection 62. The ice blocks may be stored in pans placed in the evaporator 13 and the reservoir 17 refilled to freeze another supply.

From the foregoing, it is apparent that I have provided a simple and effective arrangement for freezing ice blocks automatically. This arrangement may be employed with a refrigerator of conventional household size, and make it possible to leave the interior of the evaporator free for the storage of frozen foods or an ice supply and thus avoid the necessity of employing the interior of the evaporator both for freezing and storage.

While I have shown an arrangement of my invention in connection with a household refrigerating machine and a particular arrangement for cooling the freezing mold, other applications will readily be apparent to those skilled in the art. I do not, therefore, desire my invention to be limited to the particular construction shown and described, and I intend by the appended claims to cover all modifications within the spirit and scope of my invention.

What I claim as new and desire to secure by Letters Patent of the United States is:

1. An apparatus for making blocks of ice or similar material comprising a cell having at least a portion of its walls constructed of heat conducting material, a plunger arranged to close said cell near the bottom thereof, a conduit of heat insulating material connected in communication with the lower portion of said cell for admitting to said cell liquid to be frozen, means for cooling a wall of said cell to freeze the liquid therein, and means arranged to move said plunger upwardly through said cell for ejecting a frozen block therefrom.

2. An apparatus for making a block of ice or similar material comprising a cell having rigid heat conducting side walls, means for supplying to said cell liquid to be frozen, means for cooling the walls of said cell to freeze the liquid therein, means for preventing the freezing of said liquid near the bottom of said cell, means for pressing an ice block upwardly through said cell to eject said block, and a spring finger arranged at the top of said cell in the path of the ejected ice block for forcing the ejected block laterally away from said cell.

3. An apparatus for making blocks of ice or similar material comprising a cell having heat conducting side walls, a plunger arranged to close said cell near the bottom thereof, means for supplying to said cell liquid to be frozen, means for cooling the walls of said cell to freeze the liquid therein, means for preventing freezing of the liquid at the bottom of said cell, and means arranged to move said plunger upwardly through said cell for ejecting a frozen block therefrom.

4. An apparatus for making blocks of ice or similar material comprising an upright cell and a plunger arranged adjacent the bottom portion of said cell, said cell having the lower portion of its side walls constructed of heat insulating material and the upper portion thereof of heat conducting material, means for cooling said upper portion of said walls to freeze liquid in said cell, and means for imparting upward movement to said plunger to eject frozen blocks from said cell.

5. An apparatus for making blocks of ice or similar material comprising an upright cell and a plunger arranged adjacent the bottom portion of said cell, said cell having the lower portion of its side walls constructed of heat insulating material and the upper portion thereof of heat conducting material, means for cooling said upper portion of said walls to freeze liquid in said cell, means for imparting upward movement to said plunger to eject a frozen block from said cell, and liquid supply means for conducting liquid to the lower portion of said cell whereby said cell is supplied with liquid upon upward movement of said plunger during the ejection of the frozen block.

6. An apparatus for making blocks of ice or similar material comprising an upright cell having heat conducting upper side walls, a thermally insulated chamber having an upper portion forming the lower side walls of said cell and the remaining portion of the chamber constituting an extension of the side walls of said cell for storing liquid below said cell, a plunger arranged adjacent the upper portion of said chamber, said plunger being constructed to afford passage of liquid between said chamber and said cell, means for cooling the upper side walls of said cell to freeze liquid in said cell, and means for moving said plunger upwardly through said cell for ejecting a frozen block from said cell.

7. An apparatus for making blocks of ice or similar material comprising a cell having heat conducting side walls, means for maintaining in communication with said cell a constant supply of liquid at a level to fill said cell, means for cooling the heat conducting walls of said cell to freeze the portion of said liquid supply adjacent said walls, means for preventing the freezing of said supply of liquid at the bottom of said cell, and means for pushing the frozen block upwardly out of said cell, whereby said cell is refilled from said supply.

8. An apparatus for making blocks of ice or similar material comprising a cell having heat conducting side walls, means for maintaining in communication with said cell a constant supply of liquid at a level to fill said cell, means for cooling a wall of said cell to freeze the portion of said liquid supply therein, means for preventing the freezing of said supply of liquid at the bottom of said cell, a block ejecting plunger arranged below said heat conducting wall of said cell, and automatic means for operating said plunger periodically to eject the ice block formed therein whereby said cell is periodically refilled from said supply.

9. An apparatus for making blocks of ice or similar material comprising a cell, means including a chamber below said cell for maintaining a constant supply of liquid to be frozen at a level corresponding to the top level in said cell, means for freezing the liquid in the upper portion of said cell, a plunger arranged below said upper portion of said cell for ejecting the frozen material upwardly from said cell, said plunger extending through the wall of said chamber, and a sealing bellows within said chamber secured to said plunger and to the wall of said chamber for sealing the walls of said chamber about said plunger whereby the loss of volume due to the ejecting of the ice block is compensated by the increase in volume of the bellows while said plunger is in its raised position.

GEORGE S. HILL.